United States Patent [19]

Weirick

[11] 4,418,776
[45] Dec. 6, 1983

[54] DRIVE UNIT FOR GOLF BAG CART

[76] Inventor: Richard A. Weirick, 3740 Sioux Ct., Grandville, Mich. 49418

[21] Appl. No.: 275,635

[22] Filed: Jun. 22, 1981

[51] Int. Cl.³ .......................................... B62D 51/04
[52] U.S. Cl. ............................... 180/19 H; 180/65 R; 280/158 R; 280/646; 280/DIG. 5; 280/DIG. 6
[58] Field of Search ...................... 180/11, 19 R, 19 H, 180/65 R, 74, 221, 298, DIG. 3; 280/158 R, DIG. 5, DIG. 6, 212, 646, 158.1; 16/63

[56] References Cited

U.S. PATENT DOCUMENTS

| | | | |
|---|---|---|---|
| 597,471 | 1/1898 | Nutsford | 280/158.1 |
| 1,158,311 | 10/1915 | Schunk | 180/221 |
| 2,311,790 | 2/1943 | Tharp | 16/63 |
| 2,777,707 | 1/1957 | Cloes | 280/646 |
| 3,059,713 | 10/1962 | Beggs | 180/11 |
| 3,167,146 | 1/1965 | Rudolph | 180/19.1 |
| 3,189,364 | 6/1965 | Westphal | 280/646 |
| 3,431,994 | 3/1969 | Wood, Jr. | 180/221 |
| 3,753,473 | 8/1973 | Hollis | 180/19.3 |
| 3,941,198 | 3/1976 | Kappas | 180/11 |
| 4,081,048 | 3/1978 | Hendricks | 180/74 |
| 4,105,084 | 8/1978 | Baak | 180/11 |
| 4,106,583 | 8/1978 | Nemeth | 180/19.3 |
| 4,143,730 | 3/1979 | Desmond | 180/221 |

FOREIGN PATENT DOCUMENTS

1313746 4/1973 United Kingdom ......... 280/DIG. 5

Primary Examiner—Joseph F. Peters, Jr.
Assistant Examiner—Kenneth R. Rice
Attorney, Agent, or Firm—Price, Heneveld, Huizenga & Cooper

[57] ABSTRACT

A drive unit for a golf cart having a motor and a pinion mounted on a drive shaft extending from the motor. The motor is pivotally mounted on a leg of the cart and is adjustable to a number of positions including one where the pinion engages a wheel on the cart to drive the cart and another where the motor does not interfere with folding of the cart. A battery is suspended from the cart to power the motor, and a thumb switch is included to selectively activate the motor. Biasing structure is included to improve engagement of the pinion against the wheel when the motor is in its driving position.

12 Claims, 10 Drawing Figures

DRIVE UNIT FOR GOLF BAG CART

BACKGROUND OF THE INVENTION

1. Field of the Invention

This invention relates to golf bag cart drive units, and more specifically to golf bag cart drive units which may be mounted on conventional golf bag carts.

2. Description of the Prior Art

Although golf is an extremely popular game, transporting one's bag about the course while playing is a burdensome chore. A typical golf bag often contains a full complement of woods and irons as well as putters, extra balls, and other items making the bag quite heavy. Although electrically powered vehicles for transporting both golfers and their bags about the course are available, these vehicles are generally quite expensive and beyond the means of the average golfer.

Alternatively, lightweight golf bag carts are widely used for caddying single golf bags. Such carts are popular, especially if collapsible, and consequently widely used. However, these carts can also be burdensome to pull or push about the golf course, particularly if the user has arthritis or some other ailment making muscular exertion painful or difficult.

A wide variety of powered golf bag carts have previously been developed. However, all of these power-assisted carts have significant drawbacks. Many single bag carts have been specially designed to include integral drive means which cannot be removed from the cart. This increases the cost of the entire assembly. Secondly, the drive unit cannot be transferred to other carts. Furthermore, these carts including integral drive means tend to be relatively complex.

A number of drive units claiming to be adaptable to any single bag cart have also previously been developed. One type of unit comprises an "add-on" power driven third wheel which either pulls or pushes the cart. Examples of this type of unit may be seen in U.S. Pat. Nos. 4,105,084 issued Aug. 8, 1978 to Baak, 3,941,198 issued Mar. 2, 1976 to Kappas, and 3,059,713 issued Oct. 23, 1962 to Beggs. These units are extremely bulky, cumbersome, and heavy. Further, although these units claim to be mountable on any two-wheel cart, such installation can be quite difficult, requiring severe physical modifications to the golf cart. Finally, because the units are generally located directly under the handle, they interfere with the user's feet as he attempts to walk and pull or push the cart.

Other drive units are mounted on the cart so as to drive an existing cart wheel by its hub. This construction requires a relatively high torque motor to drive the relatively large diameter cart wheels and also requires a larger and heavier battery source. Further, these units must typically be permanently affixed to the cart frame requiring permanent modification of the cart, which can weaken the structural members. Examples of hub drive units are found in U.S. Pat. Nos. 4,106,583 issued Aug. 15, 1978 to Nemeth and 3,753,473 issued Aug. 21, 1973 to Hollis.

Another prior golf cart drive unit includes a driving pinion which engages the outer surface of an existing golf cart wheel to drive the unit, for example as in U.S. Pat. No. 3,167,146 issued Jan. 26, 1965 to Rudolph. This drive unit may be mounted only on carts having a relativley long wheel axle extending from the driven wheel, which is not typical in today's units and is limited in older style golf carts. Further, the drive unit must be permanently mounted on the cart frame so that it is not readily transferrable to other carts. This permanent affixation also makes it impossible to readily move the drive unit to a position which will not interfere with the folding of the golf bag cart. Although a spring biases the pinion against the cart wheel, this force is principally tangential to the point of contact providing relatively little effective biasing force. Further, the pinion is constantly biased against the cart wheel, especially during storage, providing a severe flat spot in the wheel. In extreme cases, the pinion will actually penetrate the wheel, damaging the wheel beyond repair.

A problem common with all of the above carts and units is that each drive unit, which cannot be moved from its driving orientation without totally removing it from the cart, interferes with the collapsing or folding of the cart. Consequently, a cart with one of the prior units installed thereon cannot be collapsed without totally removing the unit. This makes use, transportation, and storage extremely cumbersome and difficult.

SUMMARY OF THE INVENTION

The aforementioned problems are overcome by the present invention. Essentially, a drive unit is provided which is removably mountable on any conventional single bag golf cart. The drive unit includes a motor having a drive shaft and a pinion mounted on the shaft to engage the outer surface of a cart wheel. The pinion is radially biased toward the wheel to improve friction therebetween. Structure is included for pivotally mounting the motor to a structural member of the golf cart so that the motor is movable between at least two positions. In the first position, the pinion engages the driving wheel to power the cart. In the second position, the motor is pivoted away from the wheel where it will not interfere with the folding of the cart. A battery is included to power the motor, and a switch is provided to selectively activate the unit.

The golf cart drive unit of the present invention can be removably mounted on any conventional single bag cart without permanently modifying the cart. Because the cart is not permanently altered in any way, the structural members are not weakened and the cart is not defaced. Further, because the unit drives the cart through a pinion which engages the outer surface of the wheel, a relatively low torque motor may be used to drive the pinion. Because the unit is privotally mounted to the cart, it can be moved between a wheel-engaging, or driving, position and a storage position, wherein the unit does not interfere with any portion of the folded cart. Further, disengaging the pinion from the cart wheel during storage prolongs the life of the cart wheel.

These and other objects, advantages, and features of the invention will be more fully understood and appreciated by reference to the written specification and appended drawings.

DESCRIPTION OF THE PREFERRED EMBODIMENT

A golf bag cart drive unit is illustrated in the drawings and generally designated 10. Drive unit 10 is shown mounted on cart 12 which generally comprises a golf bag supporting trunk 14, a handle 16 extending upwardly and forwardly therefrom terminating in handgrip 18, two downwardly depending legs 20 and 22, two axles 21 and 23 extending from legs 20 and 22, and wheels 24 and 26 rotatably carried on axles 21 and 23 respectively.

Drive unit 10 includes motor 28 having a rotatable drive shaft 30 and pinion 32 fixedly mounted thereon. Leg bracket 34 having motor bracket 36 pivotally mounted thereon is secured to leg 20. Motor 28 is fixedly mounted on bracket 36 so that motor 28 and bracket 36 may be pivoted between a first position wherein pinion 32 engages wheel 24 (FIGS. 1, 2, 4 and 5) and a second position (FIG. 3) wherein drive unit 10 does not interfere with any portion of the collapsed cart. A spring 38 extends between motor 28 and axle 21 when unit 10 is in its driving position to bias pinion 32 against wheel 24. A battery housing 40 is suspended from trunk 14 and houses a battery (not shown) which is electrically connected through wires 92a and 92b to motor 28. Finally, switch 42 is mounted in handgrip 18 and is electrically connected through wires 100 to motor 28 to selectively activate the motor.

Figures 1, 6:
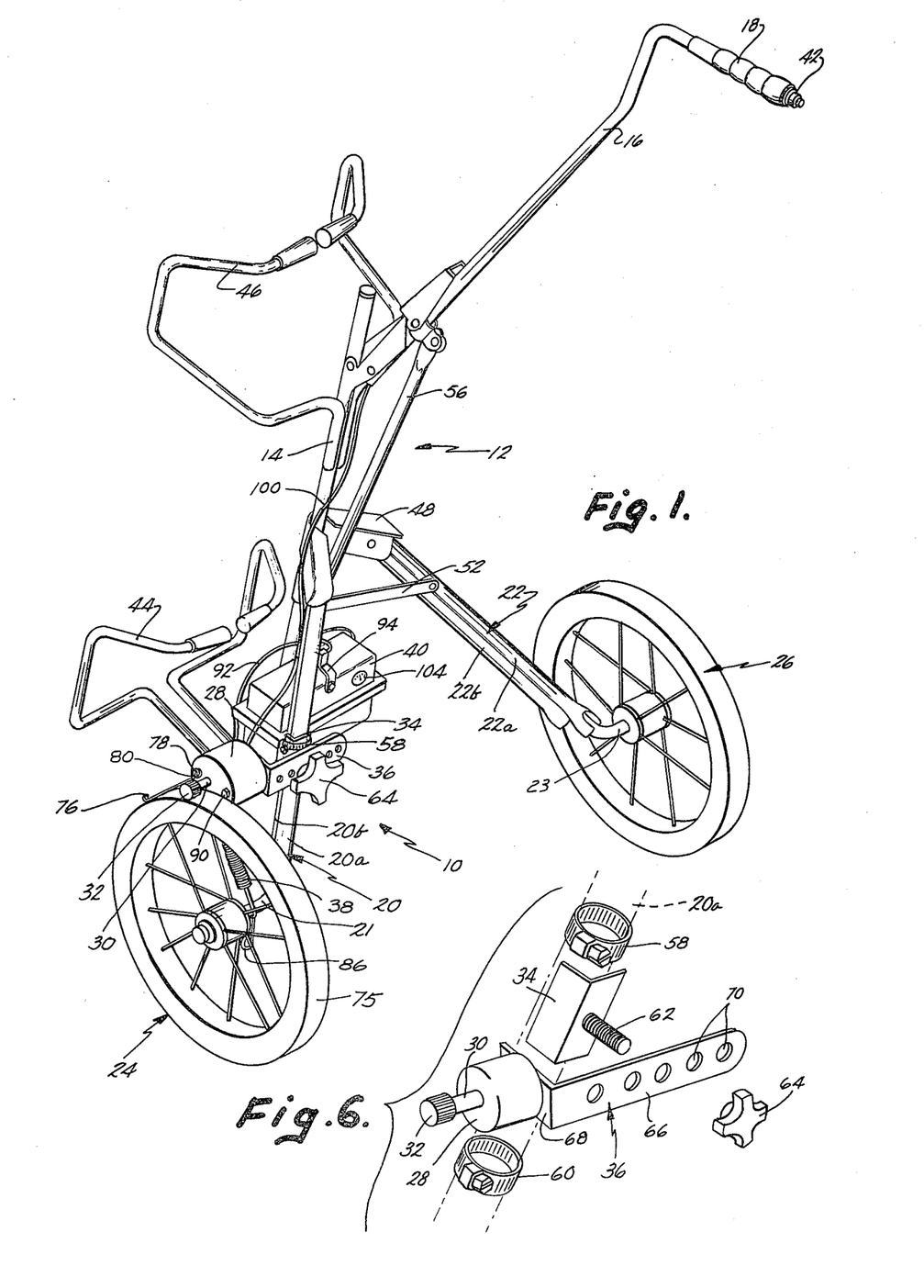
FIG. 1 is a perspective view of a golf bag cart with the drive unit of the present invention installed thereon.
FIG. 6 is an exploded view of the leg bracket, motor bracket, tightening knob, and motor.
Figures 2, 4:
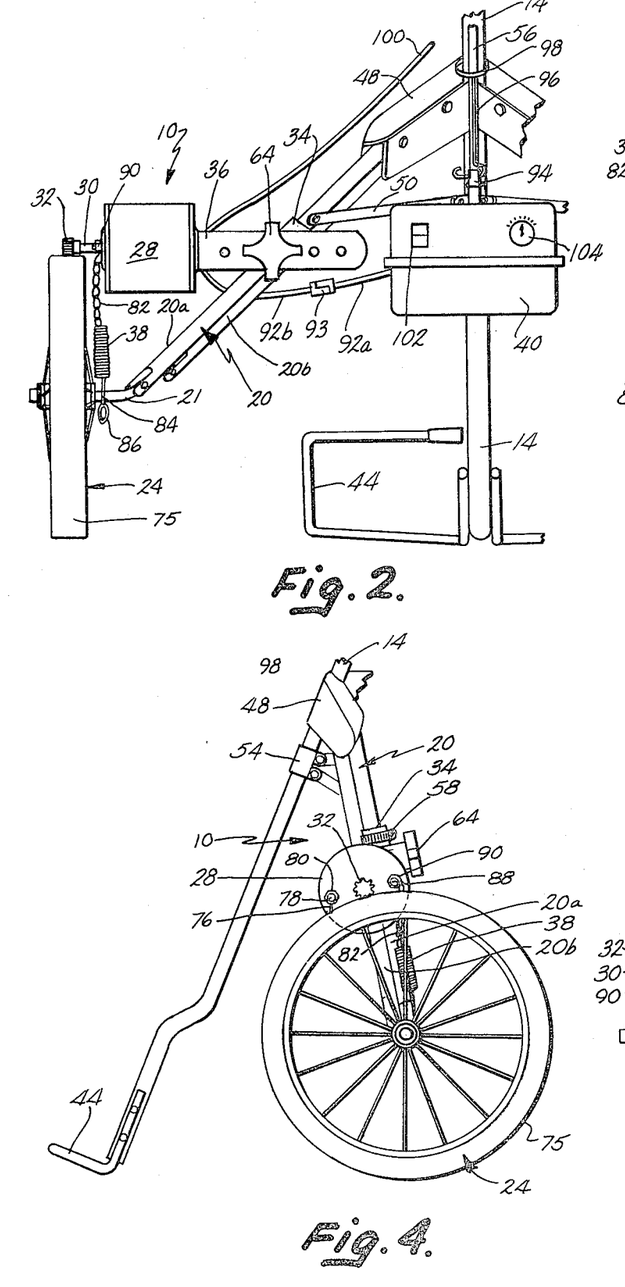
FIG. 2 is a partial front elevational view of the cart and drive unit.
FIG. 4 is a partial side elevational view of the cart and drive unit.
Figures 3, 5:
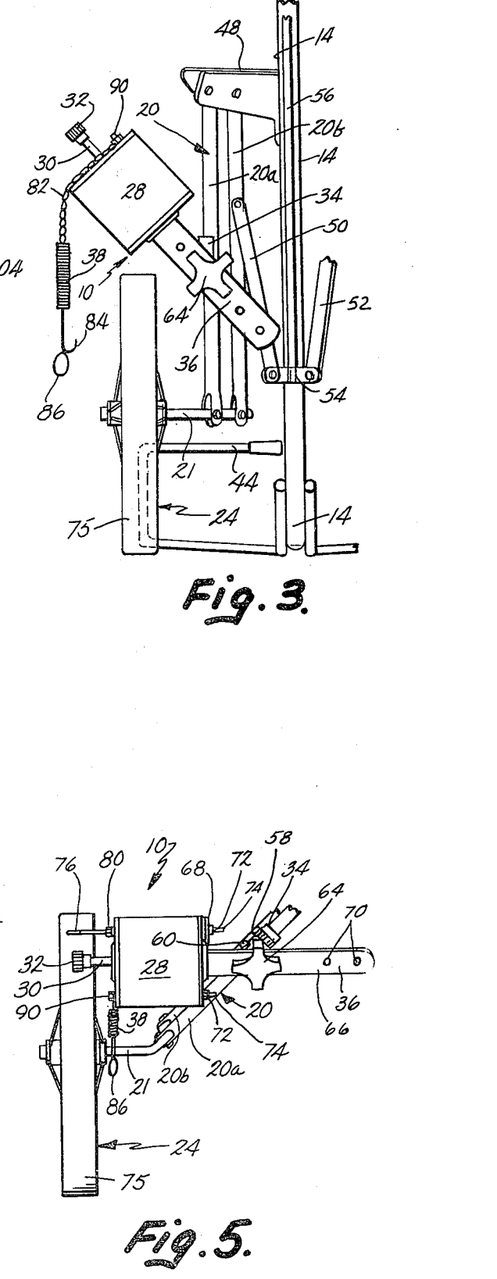
FIG. 3 is a view similar to FIG. 2 but with the cart and drive unit in their folded, or storage, positions.
FIG. 5 is a partial back elevational view of the cart and drive unit.

Drive unit 10 is mounted on cart 12 by securing leg bracket 34 to leg 20, mounting motor bracket 36 having motor 28 thereon on leg bracket 34, installing switch 42 in handgrip 18, and electrically connecting the switch to the motor. To ready cart 12 and drive unit 10 for use as shown in FIG. 1, the cart is unfolded, battery housing 40 is suspended from trunk 14 and electrically connected to motor 28, the motor is pivoted so that pinion 32 engages wheel 24, and spring 38 is secured about axle 21. When set up, the drive unit is selectively actuated using switch 42. When switch 42 is depressed, motor 28 powered by the battery rotates shaft 30 and accordingly pinion 32 which causes wheel 24 to rotate driving the cart. The user has only to steer the cart using handgrip 18. When the cart is to be collapsed, battery housing 40 is removed from trunk 14, spring 38 is released, motor 28 is pivoted upwardly to the position shown in FIG. 2 and the cart is folded, or collapsed. Drive unit 10 is readily mountable on any conventional golf bag cart and, when so mounted, may be pivoted between a wheel-engaging orientation to drive the cart and a storage orientation wherein the cart can be folded.

Cart 12 may be any cart well known to those skilled in the art, the one illustrated being sold by Fuqua Sports under the trademark "AJAY ROLL KING", and consequently a detailed description is unnecessary. Although a specific cart is shown in the drawings, drive unit 10 of the present invention may be mounted on any golf bag cart as will be described.

Lower and upper bag arms 44 and 46 are supported by and extend from trunk 14 to support a golf bag (not shown). Additionally, straps (not shown) may be used in conjunction with arms 44 and 46 to secure the bag. Handle 16 is pivotally mounted to trunk 14. Handgrip 18 is placed over the free end of handle 16 to provide a convenient grip by which one may grasp and direct cart 12. Legs 20 and 22 are pivotally mounted to bracket 48 which in turn is fixedly mounted on trunk 14. Bracket 54 is slidingly mounted on trunk 14. Leg supports 50 and 52 are pivotally mounted between sliding bracket 54 and legs 20 and 22, respectively. Similarly, connecting bar 56 is pivotally mounted between bracket 54 and the lower portion of handle 16. Consequently, cart 12 may be folded or collapsed by pivoting handle 16 downwardly which in turn forces connecting bar 56 and bracket 54 downwardly. As bracket 54 travels downwardly along trunk 14, legs 20 and 22 are drawn inwardly so that the cart is folded into a storage position as shown in FIG. 3. Conversely, when cart 12 is to be set up, handle 16 is drawn upwardly which draws bracket 54 upwardly forcing wheels 24 and 26 apart into their set-up position as shown in FIGS. 1, 2, 4 and 5.

Each of legs 20 and 22 is in fact a pair of parallel members 20a and 20b and 22a and 22b, respectively. Leg members 20a and 20b are pivotally mounted at either end to bracket 48 and axle 21. When cart 12 is set up, axles 21 and 23 extend generally horizontally from legs 20 and 22, respectively. Finally, wheels 24 and 26 are rotatably mounted, or carried, on axles 21 and 23, respectively. When set up and stationary, cart 12 rests on wheels 24 and 26 and arms 44. When cart 12 is to be moved, handgrip 18 is pulled forwardly which raises arms 44 off the ground so that cart 12 is free to move on wheels 24 and 26.

Referring to drive unit 10, leg bracket 34 is generally L-shaped in cross section and secured to leg member 20a using ring clamps 58 and 60 (FIG. 6). Consequently, cart 12 is not permanently modified in any way to receive bracket 34. Tightening knob 64 is threaded onto threaded stud 62 which extends from leg bracket 34 through one of apertures 70 in motor bracket 36. Alternatively, knob 64 can be replaced by a retaining, or jam nut 64' (e.g. FIG. 7). Leg bracket 34 is oriented so that stud 62 is positioned generally perpendicularly to axle 21. Alternatively, a stud can be welded or secured to leg member 20a, eliminating the need for bracket 34.

Mounted on stud 62 of leg bracket 34 is motor bracket 36, which is generally L-shaped, comprising apertured leg 66 and motor leg 68 extending therefrom. A plurality of apertures 70 extend through and are spaced along the length of leg 66. The one aperture 70 through which stud 62 passes is selected so that pinion 32 engages wheel 24 as will be described. By providing a plurality of apertures 70, drive unit 10 may be mounted on any cart regardless of the distance between leg 20 and wheel 24. Preferably, bracket 34 is mounted on leg member 20a at approximately the same height as the top of wheel 24 (see FIG. 2). Motor 28 is secured to motor leg 68, for example by bolting. In the preferred embodiment, nuts 72 are threaded onto posts 74 which extend outwardly from motor 28 through motor leg 68 (see FIG. 5).

Motor 28 is also well-known to one skilled in the art and consequently need not be described in detail. Suffice it to say that motor 28 is a 12-volt direct current, series-type motor having a power rating of approximately ⅛ to 1/6 horsepower and an operating speed of 1600 to 3000 rpm. Of course, series and shunt-types of motors of different capacities and speeds could be used, depending upon the particular application. Drive shaft 30 extends from motor 28 and is rotated by the motor.

Pinion 32 is fixedly mounted on shaft 30 for rotation therewith. When motor bracket 36 and consequently motor 28 are in driving position (FIGS. 1, 2, 4 and 5), pinion 32 engages the outer, or ground-engaging, surface 75 of wheel 24. Therefore, when motor 28 rotates shaft 30 and pinion 32, pinion 32 drives wheel 24, driving cart 12. The rate of speed at which cart 12 is driven can be altered by replacing pinion 32 with a pinion having a different diameter. A large diameter pinion produces a greater speed, while a small diameter pinion provides a lesser speed. If motor assembly 10 is mounted on leg 20 as shown, cart 12 is driven as though the cart is being pulled, i.e. in the direction of handle 18. On the other hand, if assembly 10 is mounted on leg 22, cart 12 is driven as though the cart is being pushed, i.e. in the direction of supports 44 and 46.

An alternative to changing the direction of drive by remounting assembly 10 on the opposite leg is to include reversing switch 102, which can reverse the direction in which shaft 30 is driven. Although switch 102 is shown mounted on housing 40, it may also be mounted on motor 28, handle 18, or any other portion of cart 12. When switch 102 is included, it causes motor 28 to rotate (1) in one direction when the switch is in one position and (2) in the opposite direction when the switch is in its other position.

Wheel scraper 76 also extends from motor 28 to engage outer surface 75 of wheel 24. Scraper 76 is formed from an integral piece of 20 to 16-gauge wire, is mounted on motor stud 78, and is secured using nut 80. Further, scraper 76 is biased against wheel 24 to engage and scrape ground-engaging surface 75. When cart 12 is used on a golf course, wheels 24 pick up moisture, mud, grass, and other debris which interfere with the engagement of pinion 32 against wheel 24. However, scraper 76 engages outer surface 75 of wheel 24 to remove the majority of this material from surface 75 just prior to its engagement with pinion 32. Consequently, scraper 76 improves the frictional engagement of pinion 32 with wheel 24.

Spring 38, which radially biases motor 28 and consequently pinion 32 toward axle 21, is secured at its upper end to chain 82 which in turn is mounted on motor stud 88 and secured thereto by nut 90. Spring 38 is secured at its opposite, or lower, end to hook 84 which is hooked about axle 21. Thumb loop 86 is integrally formed with hook 84 to provide a means by which spring 38 may be extended allowing hook 84 to be hooked onto axle 21.

The amount of biasing force exerted by spring 38 may be varied by adjusting the active length of chain 82 extending between stud 88 and spring 38. Chain 82 is secured on stud 88 through any one of the chain links. If a relatively large biasing force is desired, chain 82 is mounted on stud 88 by one of its links proximate spring 38. On the other hand, if the biasing force is to be relatively small, chain 82 is secured on stud 88 by one of its links remote from spring 38.

Battery housing 40 is suspended from trunk 14 and houses a 12-volt battery (not shown) to power motor 28. The battery may be one of many well-known models; both wet cell and dry cell batteries have been found to be particularly well-suited to the present drive unit. The battery is electrically connected by wires 92a and 92b to motor 28. Wires 92a and 92b are joined using polarized plug 93 (FIG. 2) so that the battery is always connected to motor 28 with only one polarity. This insures that shaft 30, with pinion 32 thereon, always rotates in the same direction.

Polarized plug 93 is provided to interconnect electrical wires 92a and b. Further, plug 93 insures that the battery is always connected to motor 28 with the proper polarity so that the motor rotates in the desired direction. Finally, plug 93 may be used to plug the battery into a charger (not shown) for recharging as necessary. Plug 93 insures that the battery receives a charge of the proper polarity.

Rheostat 104 can be optionally included and electrically connected in series with motor 28. Consequently, the speed at which motor 28 operates can be varied by varying the resistance of rheostat 104. Although the rheostat is shown mounted on housing 40, it may also be mounted on handle 18, motor 28, or any other portion of cart 12.

Plastic strap 98 is secured about trunk 14 immediately above bracket 48. Suspended from strap 98 is battery hanger 96, which is formed from an integral piece of wire. Housing bail 94 extends upwardly from housing 40 and is suspended on housing hanger 96 to support housing 40. With housing 40 so suspended from trunk 14, the battery remains horizontal at all times, being free to level itself regardless of the cart orientation. Further, the battery housing and battery weight lower the center of gravity of cart 12, which aids in preventing the golf cart from tipping.

Thumb switch 42 is mounted within handgrip 18. Switch 42 is a push button switch, i.e. closed when depressed and open when released. Therefore, the cart will automatically stop when the user releases switch 42, particularly if he trips or loses his balance. Switch 42 is electrically connected by wires 100 to motor 28 so that when switch 42 is depressed, motor 28 is activated. Conversely, when switch 42 is released, motor 28 is deactivated and no longer drives cart 12.

Assembly and Operation

Drive unit 10 is easily mounted on cart 12. If cart 12 is of the folding or collapsible variety, it is typically first opened to its usable position shown in FIG. 1. Leg bracket 34 is secured to leg member 20a using ring clamps 58 and 60. By using ring clamps, leg 20 is not permanently modified in any way to accommodate drive unit 10. Preferably, bracket 34 is mounted at approximately the same height as the top of wheel 24 to be generally level therewith. Motor bracket 36 having motor 28 secured thereto is then mounted on stud 62 through one of apertures 70. The receiving aperture is selected so that, when bracket 36 extends generally horizontally from bracket 34, pinion 32 will engage outer radial surface 75 of wheel 24. Tightening knob 64 is then threaded onto stud 62 and adjusted so that bracket 36 is loosely secured between bracket 34 and tightening knob 64.

One then inserts his thumb into thumb loop 86 and stretches spring 38 so that hook 84 may be secured about axle 21. If the tension within spring 38 is too great or too small, the active length of chain 82 extending between post 88 and spring 38 is adjusted to alter the tension. In such case, nut 90 is removed from post 88 so that chain 82 may be removed. A different link of chain 82 is placed over post 88 and nut 90 is replaced to secure the chain. The action of spring 38 radially biases both pinion 32 and scraper 76 into engagement with wheel 24 enabling pinion 32 to drive the wheel and scraper 76 to remove debris from outer surface 75 of the wheel. With motor 28 so mounted on cart 12, shaft 30 is generally parallel to axle 21. Tightening knob 64 is then tightened up against bracket 36.

Plastic strap 98 is then secured about trunk 14 and housing hanger 96 suspended therefrom. Wires 92a and 92b are interconnected using polarized plug 93 to provide a power circuit to motor 28. Wires 100 are positioned along trunk 14 and through hollow handle 16 to extend out of handgrip 18. Thumb switch 42 is electrically connected to wires 100 and inserted into the free end of handle 16. Housing 40 with the battery therein is suspended from hanger 96 on housing bail 94.

In use, the user grasps handgrip 18 and tilts cart 12 slightly downward so that lower bag arms 44 are raised slightly off the ground. Thumb switch 42 is then depressed which activates motor 28 to rotate shaft 30 and pinion 32 in a counterclockwise direction. Pinion 32 drivingly engages the outer surface of wheel 24 to rotate the wheel clockwise, driving the cart forwardly, or in the direction of handle 16. When the user desires to stop the cart, he simply releases thumb switch 42 which turns motor 28 off.

The biasing force between pinion 32 and wheel 24 may be varied by altering the length of chain 82 as described above. Scraper 76 engages outer surface 75 of wheel 24 to remove mud, grass, or other debris from the outer surface immediately prior to its engagement with pinion 32.

When the user desires to fold or collapse his cart for transportation and storage, battery housing 40 is removed from cart 12 by disconnecting polarized plug 93 and unhooking housing bail 94 from hanger 96. Drive unit 10 is then pivoted to the position shown in FIG. 3. This is accomplished by first releasing hook 84 from axle 21 using thumb loop 86. Motor 28 is pivoted upwardly about stud 62 to a position proximate leg member 20a as shown in FIG. 3. Tightening knob 64 is then tightened against bracket 36 to retain motor 28 in this position. Cart 12 may then be easily folded for storage with drive unit 10 mounted thereon. As can most clearly be seen in FIG. 3, drive unit 10 does not interfere with any portion of folded cart 12. Consequently, the drive unit may remain on the collapsed cart for transportation therewith so that the unit does not have to be removed and remounted each time the cart is folded and opened. Battery housing 40 is carried separately from cart 12 and may be recharged by plugging polarized plug 93 into a suitable recharger (not shown).

When one wishes to reuse the cart, the cart is first unfolded into its usable position. Motor 28 is rotated into its operative position by first loosening knob 64 and allowing the motor to swing down so that pinion 32 engages the outer surface of wheel 24. Hook 84 is secured about axle 21 so that pinion 32 and scraper 76 are biased into engagement with wheel 24. Housing 40 having the recharged battery therein is suspended on housing hanger 96 by bail 94. Wires 92b are electrically connected to wires 92a through polarized plug 93. With this relatively simple setup, drive unit 10 is ready to drive cart 12 in the manner previously described.

The drive unit of the present invention provides a simple, lightweight assembly which may be readily installed on any conventional single bag cart to remain mounted thereon whether the cart is folded or unfolded. Mounting drive unit 10 on cart 12 does not require the cart to be modified in any permanent way. Consequently, if so desired, drive unit 10 may be removed from cart 12 leaving the cart unmarked. Alternatively, if one wishes to use the cart without drive unit 10, but also without removing drive unit 10 from the cart, he may simply release spring 38 and pivot motor 28 upwardly as shown in FIG. 3, securing bracket 36 in this position using tightening knob 64. With pinion 32 so disengaged from wheel 24, cart 12 is free to be used as an unpowered cart.

ALTERNATIVE EMBODIMENTS

Figure 7:
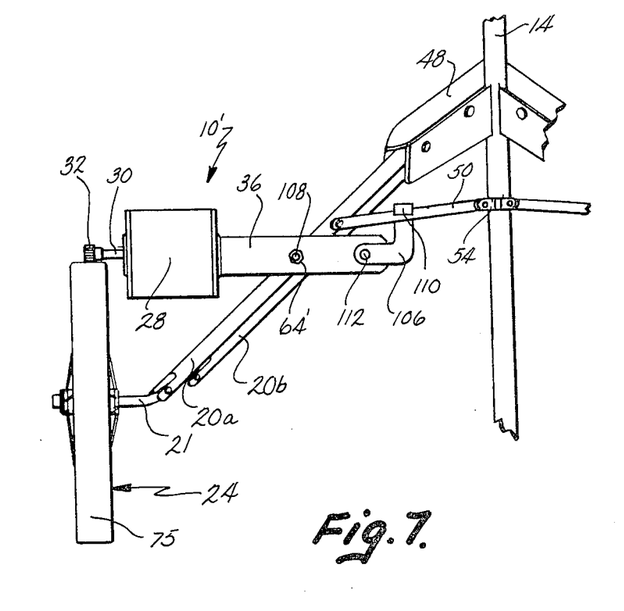
FIG. 7 is a partial front elevational view of the cart and an alternative embodiment of the drive unit.
Figure 8:
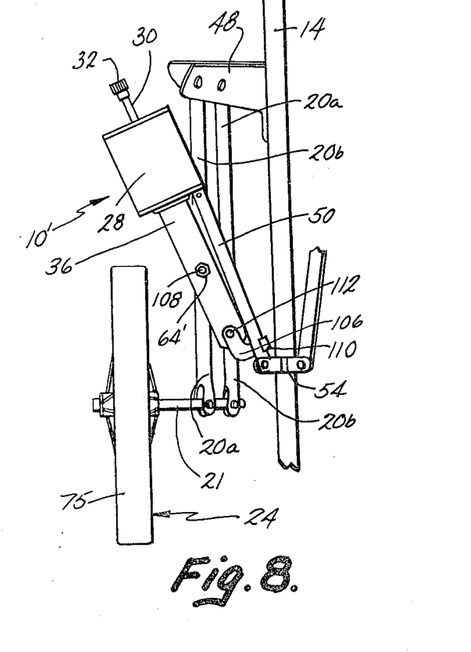
FIG. 8 is a view similar to FIG. 7 but with the cart and drive unit in their folded positions.

An alternative embodiment 10' of the drive unit is shown in FIGS. 7 and 8. Alternative embodiment 10' is permanently mounted on the cart, unlike previously described embodiment 10. However, alternative embodiment 10' is extremely similar to drive unit 10. All of the elements of cart 12 shown in FIGS. 7 and 8 are identical to cart 12 of FIGS. 1–5 and accordingly need not be described.

In alternative embodiment 10', motor bracket 36, motor 28, drive shaft 30, and pinion 32 are identical to those described in embodiment 10. A threaded stud 108 is permanently affixed, as by welding, to leg member 20a so as to be generally perpendicular to axle 21. Bracket 36 is mounted on stud 108 and secured thereto using retaining nut 64'. Arm 106 interconnects bracket 36 and leg support 50. Arm 106 is generally L-shaped and pivotally fastened at one end to bracket 36 using rivet 112. A U-shaped engaging portion 110 is integrally formed into the opposite end of arm 106 and is positioned about leg support 50 to be in sliding engagement therewith.

The operation of alternative embodiment 10' is also similar to drive unit 10 previously described. Cart 12 and drive unit 10' are shown in their operative positions in FIG. 7. Pinion 32 is radially biased into engagement with surface 75 of wheel 24 by the force exerted upwardly on bracket 36 by arm 106. When cart 12 is folded, alternative drive unit 10' automatically pivots into its folded, or storage, position as shown in FIG. 8. Arm 106, and more particularly engaging portion 110, travels along leg support 50 as cart 12 is folded which automatically pivots motor 28 about stud 108 into its storage position. Likewise, when the cart is unfolded from its position shown in FIG. 8 to a position as in FIG. 7, arm 106 again travels along leg support 50 to lower motor 28 into its operative position. With alternative drive unit 10', no additional biasing force is necessary. Consequently, spring 38, chain 82, and hook 84 are not included as they are not required to bias pinion 32 into engagement with wheel 24.

Figure 9:
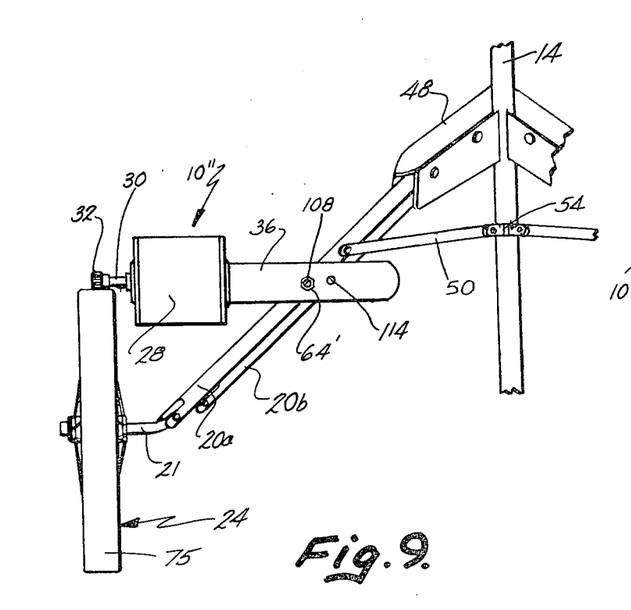
FIG. 9 is a partial front elevational view of the cart and another alternative embodiment of the drive unit.
Figure 10:
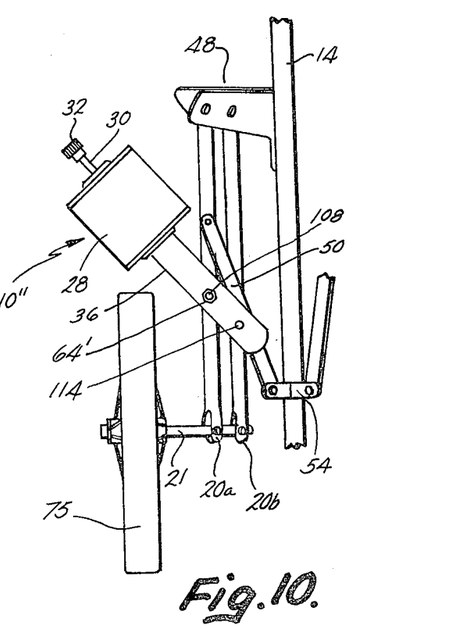
FIG. 10 is a view similar to FIG. 9 but with the cart and drive unit in their folded positions.

Another alternative drive unit 10" is shown in FIGS. 9 and 10. Again, the elements of cart 12 of FIGS. 9 and 10 are indentical to those of cart 12 of FIGS. 1–5. Further, bracket 36, motor 28, drive shaft 30, and pinion 32 are also identical to the corresponding elements of drive unit 10. Threaded stud 108 is permanently affixed, as by welding, to leg member 20a so as to be generally perpendicular to axle 21. Motor bracket 36 is pivotally mounted on stud 108 and secured thereto using retaining nut 64'. Motor bracket 36 is also pivotally mounted to leg member 20b using rivet 114.

The operation of alternative drive unit 10" is very similar to the operation of alternative drive unit 10' in that motor 28 is automatically pivoted into its storage position as cart 12 is folded. Because of the way in which leg members 20a and b are mounted to axle 21 and bracket 48, the leg members move relative one another as cart 12 is folded and unfolded. Alternative drive unit 10" takes advantage of this motion to automatically pivot motor 28 into and out of its operative position as shown in FIG. 9. As cart 12 is folded into its storage position, rivet 114 moves downwardly with respect to stud 108 so that motor 28 is pivoted upwardly into its storage position as shown in FIG. 10. Conversely, when the cart is unfolded, rivet 114 travels upwardly with respect to stud 108 to lower motor 28 into its operative position as shown in FIG. 9. As in alternative embodiment 10', the additional biasing force provided by spring 38, chain 82, and hook 84 are not required to insure the proper engagement of pinion 32 with wheel 24. The upward force exerted on bracket 36 at rivet 114 forces pinion 32 downwardly against surface 75 of wheel 24.

Although alternative drive units 10' and 10" do not require the biasing force provided by spring 38, they do require that cart 12 be permanently modified, i.e. by installing stud 108 and rivet 114, to receive the drive units. Fewer parts are required on these alternative drive units, but the alternative drive units are not readily transferable from one cart to another.

Although the drive units have been specifically described and illustrated on a collapsible cart, the drive units can be similarly mounted on a non-collapsible cart.

Of course, it is understood that the above are merely preferred embodiments of the invention and that various changes and alterations can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows.

1. A drive unit for a foldable golf bag cart having first and second legs, first and second axles extending horizontally from said first and second legs respectively, first and second wheels rotatably mounted on said first and second axles respectively, said cart being foldable between an operative position, wherein said wheels are spaced a fixed distance from one another, and a collapsed position, wherein said wheels are spaced a shorter distance from one another, said drive unit comprising:
   a leg bracket adapted to be fixedly mounted on the first leg at approximately the same height as the top of the first wheel;
   a motor having a rotatable drive shaft;
   a pinion fixedly mounted on said shaft for rotation therewith;
   battery means powering said motor;
   a switch selectively actuating said motor;
   means for supporting said motor on the first leg bracket, said supporting means being pivotal about said bracket between a first position when said cart is in said operative position, wherein said shaft is generally parallel to the first axle and said motor is located between the wheels and said pinion engages the ground-engaging surface of the first wheel, and a second position when said cart is in said collapsed position, wherein said drive unit is located out of its first position between the wheels and does not interfere with the wheels of the cart; and
   means for biasing said pinion against the first wheel when said supporting means is in said first position.

2. The drive unit of claim 1 wherein said supporting means comprises:
   a stud extending from said leg bracket;
   a motor bracket having a first end to which said motor is mounted and a plurality of apertures at a plurality of distances from said first end, each of said apertures capable of receiving said stud whereby said arm can be mounted on said stud through any one of said apertures; and
   means for securing said motor bracket on said stud.

3. The drive unit of claim 2 wherein said biasing means comprises:
   a spring having first and second ends;
   means securing said first end of said spring to said motor; and
   means extending from said second end for securing said second end to the first axle, whereby said pinion is radially biased against the first wheel.

4. The drive unit of claim 3 wherein said first end securing means comprises:
   a stud extending from said motor; and
   a chain having a plurality of links each of which can be positioned on said stud, one of said links being positioned on said stud and another or said links being joined to said first end of said spring, whereby the length of chain between said stud and said spring can be altered by changing said one link positioned on said stud.

5. The drive unit of claim 4 wherein said drive unit further comprises a wheel scraper extending from said motor to engage the outer surface of the first wheel to remove mud, grass, and other debris from the first wheel.

6. The drive unit of claim 5 wherein said leg bracket comprises an elongated member generally L-shaped in cross section and a pair of hose clamps to secure said member to the first leg.

7. The drive unit of claim 6 wherein said battery means comprises:
   a battery;
   a housing encasing said battery; and
   means for suspending said housing from the cart, means allowing said housing to remain level said suspending means allowing said housing to remain level regardless of the position of the cart.

8. The drive unit of claim 2 wherein said battery means comprises:
   a battery;
   a housing encasing said battery; and
   means for suspending said housing from the cart, said suspending means allowing said housing to remain level regardless of the position of the cart.

9. The drive unit of claim 2 wherein said drive unit further comprises a wheel scraper extending from said motor to engage the outer surface of the first wheel to remove mud, grass, and other debris from the first wheel.

10. The drive unit of claim 1 wherein said battery means comprises:
    a battery;
    a housing encasing said battery; and means for suspending said housing from the cart, said suspending means allowing said housing to remain level regardless of the position of the cart.

11. The drive unit of claim 1 wherein said drive unit further comprises a wheel scraper extending from said motor to engage the outer surface of the first wheel to remove mud, grass, and other debris from the first wheel.

12. The drive unit of claim 1 wherein said biasing means comprises:
a spring having first and second ends;
means securing said first end of said spring to said motor; and
means extending from said second end for securing said second end to the first axle, whereby said pinion is radially biased against the first wheel.

* * * * *

UNITED STATES PATENT AND TRADEMARK OFFICE
CERTIFICATE OF CORRECTION

PATENT NO. : 4,418,776

DATED : December 6, 1983

INVENTOR(S) : Richard A. Weirick

It is certified that error appears in the above-identified patent and that said Letters Patent is hereby corrected as shown below:

Column 1, lines 65-66:
 "relativley" should be --relatively--;

Column 10, line 31:
 "or" should be --of--; and

Column 10, line 50:
 delete "means allowing said housing to remain level".

Signed and Sealed this

Twenty-second Day of May 1984

[SEAL]

Attest:

GERALD J. MOSSINGHOFF

Attesting Officer

Commissioner of Patents and Trademarks